(12) United States Patent
Muralidhar et al.

(10) Patent No.: US 12,531,878 B2
(45) Date of Patent: Jan. 20, 2026

(54) DETECTION AND MITIGATION OF AUTOMATED ACCOUNT GENERATION USING ARTIFICIAL INTELLIGENCE

(71) Applicant: Stripe, Inc., South San Francisco, CA (US)

(72) Inventors: Suhas Hoskote Muralidhar, Bothell, WA (US); Prasanna Sridhar, South San Francisco, CA (US); Charlotte Gils, Otterburn Park (CA)

(73) Assignee: Stripe, Inc., South San Francisco, CA (US)

( * ) Notice: Subject to any disclaimer, the term of this patent is extended or adjusted under 35 U.S.C. 154(b) by 122 days.

(21) Appl. No.: 18/522,000

(22) Filed: Nov. 28, 2023

(65) Prior Publication Data

US 2025/0175471 A1    May 29, 2025

(51) Int. Cl.
*G06N 20/00* (2019.01)
*G06N 3/08* (2023.01)
*G06Q 40/02* (2023.01)
*H04L 9/40* (2022.01)

(52) U.S. Cl.
CPC ........ *H04L 63/1408* (2013.01); *G06Q 40/02* (2013.01); *H04L 2463/082* (2013.01)

(58) Field of Classification Search
None
See application file for complete search history.

(56) References Cited

U.S. PATENT DOCUMENTS

| | | | |
|---|---|---|---|
| 11,463,475 B1* | 10/2022 | Colon | H04M 3/42195 |
| 2018/0046475 A1* | 2/2018 | Wei | G06F 9/44552 |
| 2021/0233162 A1* | 7/2021 | Hockey | G06F 16/951 |
| 2022/0345457 A1* | 10/2022 | Jeffords | G06N 20/00 |
| 2023/0057849 A1* | 2/2023 | Scott | H04L 67/306 |
| 2023/0199025 A1* | 6/2023 | Xu | H04L 63/0869 726/22 |
| 2023/0316280 A1* | 10/2023 | Sardari | G06Q 20/4015 705/64 |

* cited by examiner

*Primary Examiner* — Christopher B Robinson
(74) *Attorney, Agent, or Firm* — Foley & Lardner LLP

(57) ABSTRACT

Disclosed herein are systems and methods for detecting automated account generation requests. An example method includes receiving an application programming interface (API) request to generate a new user account. The method then includes executing a machine learning model to predict a likelihood of the API request having been generated automatically using one or more programming protocols. The machine learning model may be trained using historic requests known to have been generated using a machine or a programming/algorithm. When the machine learning model determines that the API request is likely to have been machine-made, the method includes executing an additional security protocol associated with the new user account.

20 Claims, 6 Drawing Sheets

200

```
┌─────────────────────────────────────────────────────────────┐
│ Receive, via an application programming interface (API), an │
│ API request to generate a new user account, the API request │
│ comprising at least one user identifier and at least one    │
│ user attribute. 210                                          │
└─────────────────────────────────────────────────────────────┘
                             │
                             ▼
┌─────────────────────────────────────────────────────────────┐
│ Execute, using the at least one user identifier and the at  │
│ least one user attribute, a machine learning model to       │
│ predict a likelihood of the API request having been         │
│ generated automatically using one or more programming       │
│ protocol instead of a human user, wherein the machine       │
│ learning model has been previously trained using a training │
│ dataset comprising a set of training user accounts known to │
│ have been generated via one or more programming protocols   │
│ and their corresponding attributes, and wherein a distance  │
│ between the API request and a cluster comprising at least a │
│ subset of the set of training user accounts is correlated   │
│ to the likelihood of the API request being generated        │
│ automatically. 220                                           │
└─────────────────────────────────────────────────────────────┘
                             │
                             ▼
                   ◇ Likelihood satisfies a ◇
                     threshold? 230
              Yes  ╱                    ╲  No
                  ▼                      ▼
    ┌──────────────────────┐    ┌──────────────────────┐
    │ Execute an additional│    │ Permit the API       │
    │ security protocol    │    │ request. 240         │
    │ associated with the  │    └──────────────────────┘
    │ new user account. 250│               │
    └──────────────────────┘               ▼
                                ┌──────────────────────┐
                                │ New Account Created  │
                                │ 260                  │
                                └──────────────────────┘
```

FIG. 2

DETECTION AND MITIGATION OF AUTOMATED ACCOUNT GENERATION USING ARTIFICIAL INTELLIGENCE

TECHNICAL FIELD

This application relates generally to the generation, training, and use of computer models that analyze and detect automated account generation requests.

BACKGROUND

Systems involved in online payment transaction processing may be configured to create, maintain, and regularly update databases of user accounts involved in online payment transactions. These accounts can be created prior to or during the time when users complete an initial online payment transaction. For example, a user checking out at a merchant's online store may receive a prompt generated by a system involved in processing the payment transaction to create a new account. The user may then provide information such as the user's name, address, and the like, in response to the prompt, and the system involved may store this information in a database for future use. This enables the system to provide the information during a subsequent transaction involving the user, reducing the need for repeated communication of the same information between the user's device and the merchant's system.

However, malicious third parties have developed techniques that target these systems with the end goal of disrupting the service provided by the one or more parties involved in the transaction. As an example, a malicious third party can masquerade as multiple users and attempt to generate multiple new accounts. If successful, the malicious third party can cause systems involved in processing the payment transaction to become overwhelmed and possibly unresponsive. And conventional techniques for identifying these attempts by malicious third parties to disrupt service are becoming increasingly unsatisfactory as they typically involve the use of fixed criteria or manual (e.g., human) intervention to identify creation requests generated by such malicious third parties.

SUMMARY

In view of the above-noted challenges posed by malicious third parties, there is a desire for methods and systems that are capable of intelligently monitoring the account generation process and detecting automated account generation requests.

Systems are designed to monitor traffic originating from a particular internet protocol (IP) address and analyze the traffic to determine whether an automated account generation request is received. Conventional systems used to monitor traffic are proving to be moderately effective against sophisticated malicious third parties. To improve on these systems, when implemented, the methods and implementations described herein can intelligently analyze and detect automated account generation requests coming from one or more IP addresses. This can be particularly helpful as malicious third parties may design their programming protocols to cause the automated account generation requests to appear increasingly as if they were generated by a human.

By virtue of the implementation of the systems and methods described herein, systems involved in account generation can more accurately discern between requests to generate new user accounts that are generated automatically using one or more programming protocols and requests generated by humans. This, in turn, reduces the need for the automatic implementation of additional security protocols that often require additional communication between devices, thereby consuming more computing resources and resulting in increased network activity than is otherwise necessary. This also enables service providers or other entities described herein to more accurately determine how many new accounts that are generated are generated by human users while denying requests that could later block a true request from a human user (referred to sometimes as email address squatting).

Additionally, the systems involved can more quickly identify attacks by malicious third parties and stop computing resource consumption caused by these malicious third parties. For example, in cases where service providers provide APIs available to the public to allow for account creation outside of the context of an instant payment transaction, such service providers can implement the techniques described herein to monitor the requests they receive and quickly identify suspicious or malicious requests. This can again save computing resources from being consumed as a result of the attempted attacks prompted by the malicious third parties. And in some cases, this can prevent systems (e.g., service provider systems) from being taken down entirely (similar to what happens in a distributed denial-of-service (DDoS) attack). In some cases, this can also prevent email bounce-backs whereby additional messages are transmitted indicating that a given email address associated with a given attack during account verification is not in service, further reducing network communication.

In an embodiment, a method receiving, by a server via an application programming interface (API), an API request to generate a new user account, the API request comprising at least one user identifier and at least one user attribute; executing, by the server using the at least one user identifier and the at least one user attribute, a machine learning model to predict a likelihood of the API request having been generated automatically using one or more programming protocols, wherein the machine learning model has been trained using a training dataset comprising a set of training user accounts known to have been generated via the one or more programming protocols and their corresponding attributes, and wherein a distance between the API request and a cluster comprising at least a subset of the set of training user accounts is correlated to the likelihood of the API request having been generated automatically; and in response to the likelihood of the API request satisfying a threshold, executing, by the server, an additional security protocol associated with the new user account, wherein the threshold indicates a sensitivity level associated with new user accounts being generated by human users.

The additional security protocol can be a two-factor authentication. The additional security protocol can present an authentication protocol to determine whether the new user account was created by a human user. The at least one user attribute can be a time difference between a first timestamp for receipt of the API request and a second timestamp for receipt of a second API request. The server may execute the machine learning model at a predetermined time subsequent to receiving the API request. The at least one user attribute may be at least one of a phone number, a physical address, or an IP address associated with the API request. The method may further comprise denying, by the server, generation of the new user account as a non-human created account.

In another embodiment, a non-transitory machine-readable storage medium has computer-executable instructions stored thereon that, when executed by one or more processors, cause the one or more processors to perform operations comprising receive, via an application programming interface (API), an API request to generate a new user account, the API request comprising at least one user identifier and at least one user attribute; execute, using the at least one user identifier and the at least one user attribute, a machine learning model to predict a likelihood of the API request having been generated automatically using one or more programming protocols, wherein the machine learning model has been trained using a training dataset comprising a set of training user accounts known to have been generated via the one or more programming protocols and their corresponding attributes, and wherein a distance between the API request and a cluster comprising at least a subset of the set of training user accounts is correlated to the likelihood of the API request having been generated automatically; and in response to the likelihood of the API request satisfying a threshold, executing an additional security protocol associated with the new user account, wherein the threshold indicates a sensitivity level associated with new user accounts being generated by human users.

In yet another embodiment, a system comprises a processor configured to: receive, via an application programming interface (API), an API request to generate a new user account, the API request comprising at least one user identifier and at least one user attribute; execute, using the at least one user identifier and the at least one user attribute, a machine learning model to predict a likelihood of the API request having been generated automatically using one or more programming protocols, wherein the machine learning model has been trained using a training dataset comprising a set of training user accounts known to have been generated via the one or more programming protocols and their corresponding attributes, and wherein a distance between the API request and a cluster comprising at least a subset of the set of training user accounts is correlated to the likelihood of the API request having been generated automatically; and in response to the likelihood of the API request satisfying a threshold, executing an additional security protocol associated with the new user account, wherein the threshold indicates a sensitivity level associated with new user accounts being generated by human users.

BRIEF DESCRIPTION OF THE DRAWINGS

Non-limiting embodiments of the present disclosure are described by way of example with reference to the accompanying figures, which are schematic and are not drawn to scale. Unless indicated as representing the background art, the figures represent aspects of the disclosure.

FIG. 2 illustrates a flow diagram of a process executed by an account verification system, according to an embodiment.

DETAILED DESCRIPTION

Figure 1:
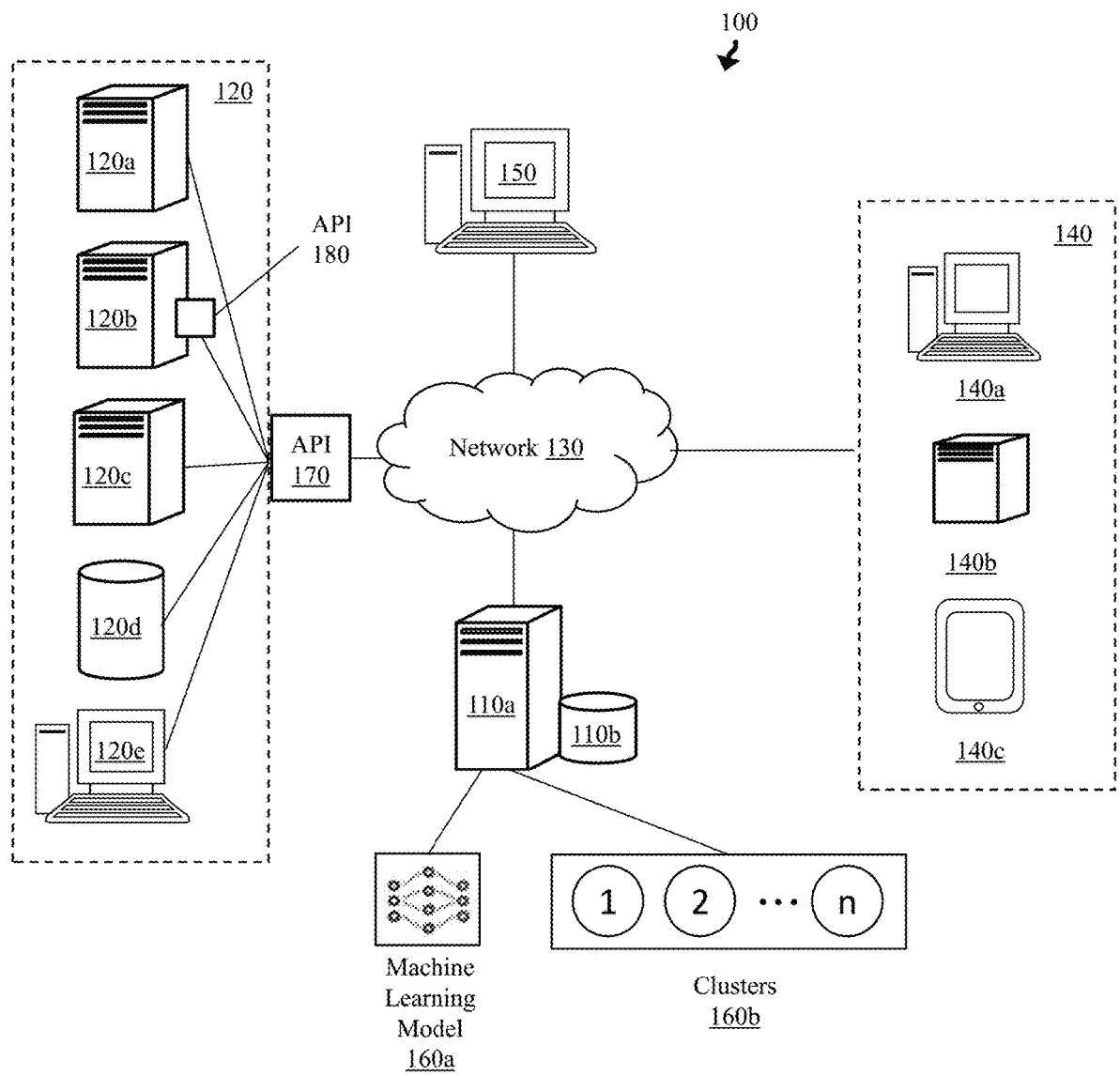
FIG. 1 illustrates various components of an account verification system, according to an embodiment.

Reference will now be made to the illustrative embodiments depicted in the drawings, and specific language will be used here to describe the same. It will nevertheless be understood that no limitation of the scope of the claims or this disclosure is thereby intended. Alterations and further modifications of the inventive features illustrated herein—and additional applications of the principles of the subject matter illustrated herein—that would occur to one skilled in the relevant art and having possession of this disclosure, are to be considered within the scope of the subject matter disclosed herein. Other embodiments may be used and/or other changes may be made without departing from the spirit or scope of the present disclosure. The illustrative embodiments described in the detailed description are not meant to be limiting of the subject matter presented.

FIG. 1 is a non-limiting example of components of an account verification system 100 in which an analytics server 110a operates. The analytics server 110a may utilize features described in FIG. 1 to obtain data, analyze the data, and permit or not permit new user account generation based on analyzing the data. The analytics server 110a may be communicatively coupled to a system database 110b, service providers 120a-e (collectively service providers 120), end-user devices 140a-c (collectively end-user devices 140), and an administrator computing device 150. The analytics server 110a may also use one or more computer models (e.g., machine learning model 160a) and one or more clusters (e.g., of clusters 160b including clusters 1–n that can be determined based on the techniques described herein) to analyze the data.

The account verification system 100 is not confined to the components described herein and may include additional or other components not shown for brevity, which are to be considered within the scope of the embodiments described herein.

The above-mentioned components may be connected to each other through a network 130. The examples of the network 130 may include, but are not limited to, private or public LAN, WLAN, MAN, WAN, and the Internet. The network 130 may include both wired and wireless communications according to one or more standards and/or via one or more transport mediums.

The communication over the network 130 may be performed in accordance with various communication protocols such as Transmission Control Protocol and Internet Protocol (TCP/IP), User Datagram Protocol (UDP), and IEEE communication protocols. In one example, the network 130 may include wireless communications according to Bluetooth specification sets or another standard or proprietary wireless communication protocol. In another example, the network 130 may also include communications over a cellular network, including, e.g., a GSM (Global System for Mobile Communications), CDMA (Code Division Multiple Access), and/or EDGE (Enhanced Data for Global Evolution) network.

The analytics server 110a may generate and display an electronic platform (e.g., an account verification platform that is sometimes referred to as a platform) configured to receive requests to verify data (e.g., verify whether one or more accounts are generated based on human input or an automated account generation protocol) and provide output based on the results. The electronic platform may include one or more graphical user interfaces (GUIs) displayed on the end-user device 140 and/or the administrator computing device 150. An example of the platform generated and hosted by the analytics server 110a may be a web-based application or a website configured to be displayed on various computing devices, such as mobile devices, tablets, personal computers, and the like. The platform may include various input elements configured to receive a request and data to be verified. For instance, an end-user may access the platform to upload a file, document, or other user input to be verified (e.g., when executing additional security protocols and/or the like).

The analytics server 110a may be any computing device comprising a processor and non-transitory, machine-readable storage capable of executing the various tasks and processes described herein. The analytics server 110a may employ various processors such as a central processing unit (CPU) and graphics processing unit (GPU), among others. Non-limiting examples of such computing devices may include workstation computers, laptop computers, server computers, and the like. While the account verification system 100 includes a single analytics server 110a, the analytics server 110a may include any number of computing devices operating in a distributed computing environment, such as a cloud environment.

The analytics server 110a may utilize one or more application programming interfaces (APIs) to communicate with one or more of the computing devices described herein. For instance, the analytics server 110a may utilize one or more APIs to automatically transmit/receive data to/from the end user devices 140 and/or the service providers 120. The analytics server 110a may be in communication with an API 170 that is in turn in communication with different service providers 120. For instance, end user device 140 may communicate data associated with requests to generate new accounts to the service providers 120 via the API 170. In this instance, the API 170 may be associated with (e.g., hosted by) the analytics server 110a and configured to transmit the data to the analytics server 110a. The analytics server 110a may analyze the data and determine whether or not to transmit the requests to the service providers 120 based on analyzing the requests. The one or more of the service providers 120 may include their own APIs. For instance, the service provider 120b may host its own API 180 that may be in direct communication with the analytics server 110a (not explicitly shown) or in indirect communication with the analytics server 110a (e.g., via the API 170 and/or via network 130). In this instance, the service provider 120b may transmit data associated with the request to generate the new user account to cause the analytics server 110a to determine whether to permit or not permit the generation of the new user account.

Service providers 120 may include one or more computing devices comprising a processor and non-transitory, machine-readable storage capable of executing the various tasks and processes. The service providers 120 may also comprise other computing components than servers, such as, for example, a computer (e.g., 120e) and/or a database (e.g., 120d). However, for ease of description, FIG. 1 refers to all the components depicted as service providers 120. In some embodiments, the service providers 120 are associated with a financial services provider that can offer payment processing services.

The service providers 120 may represent various computing devices that receive, retrieve, and/or access data associated with requests to generate new accounts. Service providers 120, as used herein, may include a computing device associated with an entity that manages databases associated with user accounts (e.g., that are the same as, or similar to, database 120d). Service providers 120 may cause the data associated with the requests to be stored in the databases or not stored in the databases. For example, service providers 120 may cause the data associated with the requests to be stored in the databases or not stored in the databases based on receiving an indication from the analytics server 110a to permit or not permit the generation of the corresponding new user accounts.

End-user devices 140 may represent any computing device comprising a processor and a non-transitory, machine-readable storage medium capable of performing the various tasks and processes described herein. Non-limiting examples of an end-user device 140 include workstation computers, laptop computers, phones, tablet computers, and server computers. During operation, various users (e.g., customers, individuals associated with issuing banks, merchants, individuals associated with acquiring banks, and/or the like) may use end-user devices 140 to access the platform operationally managed by the analytics server 110a. Even though referred to herein as "end-user" devices, these devices may not always be operated by end-users. For instance, an end user device 140c, such as a tablet may be used by a merchant (or another person on behalf of a merchant), a loan applicant, a customer, or the like.

As described herein, the analytics server 110a may use various methods to analyze a request to generate the new user account, the request associated with (e.g., originating from) an end user device 140 and determine whether the request was created by a human or automatically using one or more programming protocols. For instance, the analytics server 110a may receive a request to generate the new user account via an API (referred to herein as an API request) from a customer via the end user device 140c and a second API request from a malicious entity via the end-user device 140a. The analytics server 110a may use various methods discussed herein and execute one or more of the machine learning models 160 to analyze the API requests. The analytics server 110a may then determine that the first API request is generated based on user (e.g., human) input and that the second API request is generated based on an automation protocol.

The administrator computing device 150 may represent a computing device operated by a system administrator. The administrator computing device 150 may be configured to monitor attributes generated by the analytics server 110a (e.g., a suitable service provider or various analytic metrics determined during training of one or more machine learning models and/or systems); monitor one or more machine learning model 160a utilized by the analytics server 110a, service providers 120, and/or end-user devices 140; review feedback; and/or facilitate training or retraining (calibration) of the machine learning model 160a that are maintained by the analytics server 110a. The administrator computing device 150 may display a GUI indicating the request(s) and their corresponding suitable service provider(s), where the administrator computing device 150 can override determinations not to permit the generation of new user accounts by the analytics server 110a. For instance, the administrator computing device 150 can manually transmit a particular request to a particular service provider. The administrator computing device 150 can generate a risk score based on one or more API requests and one or more determinations made by the analytics server 110a and determine whether to override the determination not to permit the generation of the new user accounts. For example, if a merchant is running a sale that would ordinarily correspond to receiving a higher number of API requests associated with a set of IP addresses, the administrator computing device 150 may cause the analytics server 110a to permit the generation of new user accounts associated with these API requests. The administrator computing device 150 may determine whether one or more user accounts corresponding to a given API request to generate a new user account already exists and prevent or forgo prevention of the new user account from being generated based on whether the corresponding user accounts already exist.

The machine learning model 160a may be stored in the system database 110b. The machine learning model 160a may be trained using data received or retrieved from the platform, the service providers 120, the end user devices 140 and/or other data sources. The analytics server 110a may train the machine learning model 160a using a training dataset generated based on techniques for identifying suitable data described herein.

As described herein, the analytics server 110a may store the machine learning model 160a (e.g., neural networks, random forest, support vector machines, regression models, recurrent models, and/or the like) in an accessible data repository, such as the system database 110b.

FIG. 2 illustrates a flow diagram of a process 200 executed by an analytics server. The process 200 includes steps 210-230. However, other embodiments may include additional or alternative steps or may omit one or more steps altogether. The process 200 is described as being executed by an analytics server that is the same as, or similar to, the analytics server 110a described in FIG. 1. However, one or more steps of process 200 may also be executed by any number of computing devices operating in the distributed computing system described in FIG. 1. For instance, one or more computing devices (e.g., computing devices that may be the same as, or similar to, the end user devices 140, service provider 120, and/or administrator computing device 150) may perform some or all of the steps described in FIG. 2. Using the methods and systems described herein, such as the process 200, the analytics server may generate, train, and use computer models to analyze and detect API requests associated with requests to generate new user accounts that are generated automatically.

At step 210, the analytics server receives a request (an API request) to generate a new user account. For example, the analytics server may receive the request to generate a new user account from one or more computing devices. In such an example, the API request is received based on the one or more computing devices transmitting the API request in accordance with one or more APIs associated with the analytics server and/or the service provider. In some embodiments, the one or more computing devices that transmit the API request are the same as, or similar to, the end user devices 140, service provider devices 120, and/or administrator computing device 150 described in FIG. 1.

The API request includes data associated with a request to generate a new user account. For example, the API request can include data associated with at least one identifier. The at least one identifier may represent or more of an electronic mail (email) address, a physical (or postal) address, a telephone number and/or metadata associated with the telephone number, an IP address and/or metadata associated with the IP address, a merchant identifier (e.g., a merchant account number and/or the like), an application identifier (e.g., an application hosted by a service provider and/or the like), a customer identifier (e.g., a customer account number and/or the like), a device identifier (e.g., a MAC address and/or metadata associated with the device) and/or the like.

The at least one identifier is associated with an end user device. The at least one identifier is further associated with a user (e.g., a customer). In other examples, the at least one identifier is associated with one or more service provider devices. In this example, the at least one identifier is further associated with a service provider. Additionally, or alternatively, the at least one identifier can include a digital fingerprint. For example, the at least one identifier can include a digital fingerprint associated with an application (e.g., a web browser) running on the end user devices used to generate and transmit the API requests. In this example, the digital fingerprint can be a hash associated with a server session (e.g., digital fingerprint generated using a JA3 or JA3s fingerprinting technique).

Additionally, or alternatively, the API request can include data associated with at least one user attribute. For example, the data associated with the at least one user attribute can include a first time stamp and a second time stamp. The at least one user attribute can be a difference between a first time stamp (e.g., a time stamp when the API request is received) and a second time stamp (e.g., a time stamp when a second API request is received). In some embodiments, the first time stamp is determined by the analytics server based on when the analytics server receives the first API request.

The first time stamp is determined by the analytics server based on when another computing device such as a service provider device and/or administrator computing device receives the first API request. The second time stamp is determined by the analytics server based on when the analytics server receives a second API request. The second time stamp is determined by the analytics server based on when another computing device such as a service provider device and/or administrator computing device receives the second API request. In some embodiments, the at least one user attribute may be the same as, or similar to, the at least one identifier (described above)

The API request is generated. For example, the API request can be generated by end user devices, service provider devices and/or administrator computing devices. In some examples, the end user devices can generate the API request based on receiving input from a user. In this example, the user may be involved in an online payment transaction and may be providing the input via the end user devices in response to a prompt displayed on the end user devices to generate a new account. In these examples, the user may cause the user device to send data associated with the API request to the analytics server.

The end user devices can generate the API request based on receiving input from a computing device controlled by a malicious third party (not explicitly shown in FIG. 1). In these examples, the malicious third party can be controlling the end user devices and causing the end user devices to generate the API request. In some examples, the end user devices are devices that are associated with (e.g., under direct control of) malicious third parties. For example, end user devices can include servers under direct control of malicious third parties attempting to cause the analytics server to generate one or more accounts. In these examples, the malicious third party may cause the server to send data associated with multiple API requests from one or more IP addresses to the analytics server.

At step 220, the analytics server executes a machine learning model to predict a likelihood that the request to generate the new user account was generated automatically. For example, the analytics server can execute the machine learning model to predict a likelihood of the API request having been generated automatically using one or more programming protocols.

In some examples, the analytics server can execute the machine learning model to predict the likelihood based on one or more API requests received by the analytics server. For example, the analytics server can execute the machine learning model to predict the likelihood based on one or more API requests received during a particular period of time. In an example, the analytics server can execute the machine learning model to predict the likelihood based on the analytics server receiving the API request at a predetermined time subsequent to receiving the API request. In a non-limiting example, the time difference (between the received request), when combined with various other factors, may indicate a potential creation via one or more malicious third parties or otherwise indicate that the requests are automatically generated. For instance, the analytics server may receive ten requests where the requests are sequentially received within a short time window. While the timing may not indicate that the requests are generated automatically by a malicious party, in some embodiments, they may be ingested by the machine learning model and may contribute to other factors indicating a potential for malicious activity.

In some examples, the analytics server can execute the machine learning model to predict the likelihood based on the at least one user identifier and/or the at least one user attribute associated with the API request. For example, the analytics server can generate data associated with an input (e.g., a set of input feature values similar to those described herein) to provide to the machine learning model to cause the machine learning model to predict the likelihood that the request to generate the new user account was generated automatically. In this example, the analytics server can then provide the data associated with the input to the machine learning model and cause the machine learning model to output the predicted likelihood that the request to generate the new user account was generated automatically.

The analytics server generates a training dataset. For example, the analytics server can generate a training dataset based on one or more training/test (e.g., previous or historical) API requests. In such an example, the analytics server can generate the training dataset by including data associated with the one or more API requests in the training dataset. The analytics server can include the data associated with the one or more API requests in the training dataset based on determining that the one or more API requests have a timestamp that satisfies a threshold range. The threshold range can be a range between a first point in time and a second point in time. The second point in time may be a current point in time. In this way, the training dataset may include a rolling time window. This allows the training dataset to include more recent data, such that the machine learning model is trained using the latest known malicious third-party activities, thereby learning new patterns of how accounts can be automatically created.

The analytics server may include the data associated with the one or more API requests in the training dataset based on the analytics server updating the training dataset. In an example, the analytics server can generate a training dataset and use the training dataset to train one or more machine learning models (described below). After generating the training dataset, the analytics server may receive additional API requests involving requests to generate new user accounts, the requests also being generated automatically using the one or more programming protocols. The analytics server may then generate a new training dataset or replace some or all of the previously received API requests with the additional API requests.

The analytics server may again cluster the API requests in the new or updated training dataset. The analytics server may then train or update the training of machine learning models similar to how the training is described herein. In some embodiments, the analytics server iteratively stores one or more versions of the training datasets (e.g., every five minutes, every ten minutes, every 400 API requests, every 800 API requests, and/or the like) and trains existing or new machine learning models based on one or more of the stored training datasets. In this way, the analytics server can constantly update the machine learning models used to analyze API requests based on newer or more relevant API requests that are transmitted by the end user device to generate new user accounts.

The analytics server may send a message to delete one or more new user accounts or execute an additional security protocol based on updating the training dataset. For example, the analytics server may determine/identify one or more API requests that are associated with requests to generate new user accounts that were generated automatically using one or more programming protocols based on the analytics server clustering API requests to train new (or update existing) machine learning models (as described above). In this example, because the API requests were identified during the clustering stage and not using the later-trained or later-updated machine learning model, the analytics server may send the message to delete one or more new user accounts or execute the additional security protocol based on determining that certain API requests are associated with clusters of API requests where they involve requests to generate new user accounts that were generated automatically using one or more programming protocols.

Additionally, or alternatively, the analytics server can generate the training dataset by including data associated with one or more API requests that the analytics server determines are known to be further associated with requests to generate new accounts. For example, the analytics server may determine that one or more API requests are associated with (e.g., correspond to) one or more requests to generate new accounts that are generated via one or more programming protocols. The analytics server may include data associated with the API requests that correspond to the one or more requests to generate user accounts in the training dataset. The analytics server may also associate the API requests with tags indicating that the API requests were associated with requests to generate new user accounts that are generated automatically using the one or more programming protocols, such as using a website to create accounts and/or directly making the accounts through the API.

The analytics server may determine one or more clusters based on the data included in the training dataset. For example, the analytics server may determine the one or more clusters based on the analytics server clustering the API requests in the training dataset. In such an example, the analytics server may cluster the API requests based on (e.g., in accordance with) attributes associated with (e.g., corresponding to) the API requests. In this example, the analytics server may cluster the API requests based on (e.g., using) a clustering algorithm (e.g., K-means clustering and/or the like). Accordingly, a cluster of API requests represents a group of API requests that share one or more attributes, such as they have values that are similar and/or follow similar patterns to groups of existing API request attributes. For instance, a cluster of API requests may include 50 API requests that when analyzed have similar email addresses or email addresses that follow the same patterns (e.g., that have been generated automatically using the same programming protocols).

Additionally, or alternatively, the analytics server may use clustering algorithms such as Density-Based Spatial Clustering of Applications with Noise (DBSCAN). In some embodiments, the analytics server may include one or more tags with the one or more API requests indicating that the API requests are associated with a particular cluster. The analytics server may determine a threshold distance associated with two or more API requests in each cluster. For example, the analytics server may determine the threshold distance (e.g., a maximum distance) between API requests included in a given cluster. The distance may be referred to as a string distance metric (e.g., a Jaro-Winkler distance metric).

The analytics server may train a machine learning model using the training dataset discussed herein. For example, the analytics server may train a machine learning model based on one or more API requests and their corresponding tags. In this example, the analytics server may provide the API requests as inputs to the machine learning model to cause the machine learning model to generate an output. The output may then be compared to the tag to determine whether the machine learning model appropriately classified the API requests. Where the machine learning model does not appropriately classify the API requests (e.g., where the output of the machine learning model does not correspond to a classification represented by the tag), the analytics server may cause one or more aspects of the machine learning model (e.g., one or more weights associated with one or more hidden layers) to be updated. This process may be repeated until the output of the machine learning model matches the corresponding tags. In some embodiments, the tags associated with the API requests may represent a classification of each API request as either being generated using one or more programming protocols or not being generated using one or more programming protocols. The classification may be represented as a binary output or a value corresponding to a degree to which the given API request corresponds to (e.g., is similar to) API requests that were known to have been generated using one or more programming protocols. The machine learning model may include a neural network, a deep neural network (DNN), an autoencoder, and/or the like.

In some embodiments, the analytics server may generate a set of input feature values for each API request associated with the training dataset. For example, the analytics server may generate a set of input feature values representing certain common aspects involved in each API request. The analytics server may then provide the set of input feature values for each API request and a corresponding tag to the machine learning model to train the machine learning model. As noted above, the tag may indicate that the corresponding request to generate a new user account was generated automatically using one or more programming protocols. Additionally, or alternatively, the tag may represent a cluster associated with the API request or a distance between one or more API requests included in a cluster. For example, the tag may indicate that a cluster (similar to clusters 160b of FIG. 1) corresponds or does not correspond one or more API requests used to train the machine learning model.

The API request may be determined to be a request to generate a new user account that was generated automatically using one or more programming protocols based on the API request being associated with multiple clusters. For example, the analytics server may determine that the API request is a request to generate a new user account that was generated automatically using one or more programming protocols based on the analytics server associating the API request with a discrete variable cluster and one or more of clusters of identifiers (e.g., a cluster associated with phone numbers, a cluster associated with email accounts, and/or the like). In this example, the analytics server may add a tag indicating that the request to generate the new user account was generated automatically using one or more programming protocols based on the API request being associated with the discrete variable cluster and the other cluster(s).

In some embodiments, the analytics server may train the machine learning model to predict a likelihood that a request to generate a new user account corresponding to a given API request is known to be generated via one or more programming protocols. For example, the machine learning model may be trained to predict a distance between a given API request and at least one API request corresponding to a cluster, the cluster comprising at least a subset of the set of training user accounts in the training data. In this example, the distance may correspond to (e.g., be correlated with) a likelihood that the given API request is associated with a cluster of API requests that were generated automatically using one or more programming protocols. For example, a shorter distance may indicate that the API request (e.g., one or more aspects of the API request such as the IP address used, the time the API request was sent, the email address included in the API request and/or like aspects) is more similar (has a higher degree of similarity) to an API requests associated with (e.g., included in) a cluster than other API requests that are not associated with the cluster. Where the cluster is a cluster of API requests that were generated automatically using one or more programming protocols, a shorter distance indicates more similarity to data that reflects a greater likelihood the given API request was generated automatically using the one or more programming protocols (and conversely the longer the distance, the less likely the given API request was generated automatically).

The likelihood that a particular API request may be associated with a cluster of API requests generated automatically (e.g., machine made) may correspond to a relative distance of the particular API request to the cluster.

At step 230, the analytics server may determine whether the likelihood calculated in the step 220 satisfies a threshold. In some embodiments, the threshold indicates a sensitivity level associated with new user accounts being generated by human users. The threshold can be automatically selected by the analytics server and/or revised by a system administrator. For example, the analytics server may determine that one or more API requests were received that were generated automatically (e.g., based on input from a system administrator or messages received from one or more service providers involved in the API request) and that the one or more API requests did not satisfy the threshold to cause the additional security protocol to be executed. In this example, the analytics server may then automatically select a different threshold that, had it been applied, would have resulted in the given API request satisfying the threshold to cause the additional security protocol to be executed. In other examples, a system administrator may provide input (e.g., via a user interface associated with the analytics server and/or the service providers) to select or revise the threshold. In some embodiments, the threshold may be expressed in terms of percentage, such as 50% likelihood that the API request was generated by a machine or otherwise automatically generated by an entity that is not human.

If the analytics server determines that the threshold is not satisfied ("no" branch), the analytics server may proceed to the step 240 where the API request is permitted and a new account is created (step 260, below). For instance, the analytics server transmits the API request to another server that processes the API request.

In some embodiments, if the analytics server determines that the API request is likely to have been generated via a protocol other than a human user, the analytics server may deny the API request. For instance, if the API request corresponds to a request to generate a new account, the analytics server may deny the generation of the new account. The analytics server may transmit a notification to one or more devices (e.g., devices associated with the API request, such as devices requesting the creation of the new account) that the requested new account cannot be generated. However, in some cases, instead of denying the API request, the analytics server may proceed to the step 250 where the analytics server can request additional security protocols to be implemented.

At step 250, the analytics server may execute an additional security protocol associated with the new user account. For example, the analytics server can execute the additional security protocol based on the analytics server determining that the likelihood the new user account is generated automatically using one or more programming protocols satisfies a threshold.

The analytics server may execute an additional security protocol that is associated with a two-factor authentication protocol. For example, the analytics server may send a request to confirm the identity of the user generating the request to generate the new user account. In such an example, the analytics server may send the request to an end user device, an email account, and/or the like that is associated with the user. Additionally, or alternatively, the analytics server may execute an authentication protocol. For example, the analytics server may send a one-time password (OTP) to an end user device associated with the user that is further associated with the request to generate the new user account. The user may the provide the OTP via the corresponding end user device to the analytics server to confirm that the user is a human and that the user transmitted the request to generate the new user account. In some embodiments, the analytics server may send a request to an end user device to respond to a Completely Automated Public Turing Test to Tell Computers and Humans Apart (captcha) prompt (e.g., a captcha prompt, a reCAPTCHA prompt, an hCAPTCHA prompt based on image labeling, and/or the like). For example, the analytics server may send a captcha prompt (e.g., to be displayed via an iFrame and/or the like) and a user may provide input to the analytics server via their end user device responsive to the captcha prompt.

The analytics server may determine whether to permit the generation of a new user account. For example, the analytics server may determine to permit the generation of the new user account based on the successful resolution of the two-factor authentication protocol or another authentication protocol. In this example, the end user device may transmit data to the analytics server, confirming the identity of the user (e.g., by the intended user). In some embodiments, the analytics server may permit one or more computing devices to generate and transmit one or more messages based on the analytics server determining to permit the generation of the new user account. For example, the analytics server may permit one or more computing devices to generate and transmit one or more emails associated with a welcome email and/or the like indicating that the new user account was approved and/or successfully generated.

Alternatively, the analytics server may determine not to permit the generation of the new user account. For example, the analytics server may determine not to permit the generation of a new user account based on the unsuccessful resolution of the two-factor authentication protocol or another authentication protocol. In this example, the end user device may transmit data to the analytics server that does not confirm the identity of the user (e.g., by the intended user). In some examples, the analytics server may forgo or may cause one or more device to forgo, sending communications (e.g., welcome emails and/or the like) based on determining not to permit generation of the new user account.

Additionally, or alternatively, the end user device may forgo transmitting data to the analytics server, and the two-factor authentication protocol may time out. In these examples, the analytics server may forgo permitting the generation of the new user account. For example, the analytics server may send a message to one or more service provider devices not to permit the generation of the new user account. Additionally, or alternatively, the analytics server may forgo transmitting data associated with the request to generate the new user account to one or more computing devices (e.g., one or more service providers and/or the like).

At step 260, a new account is created. In some embodiments, the analytics server may create the new account. For example, the analytics server may create the new account based on the API request. In some embodiments, the analytics server may create the new account and provide data associated with the new account to one or more service providers. In some embodiments, the analytics server may cause one or more other computing devices to create the new account. For example, the analytics server may provide a message to one or more service providers associated with the API request to cause the one or more service providers to create the new account. In this example, the analytics server may include the API request and/or an indication that the API request was not generated using one or more programming protocols.

Figure 3:
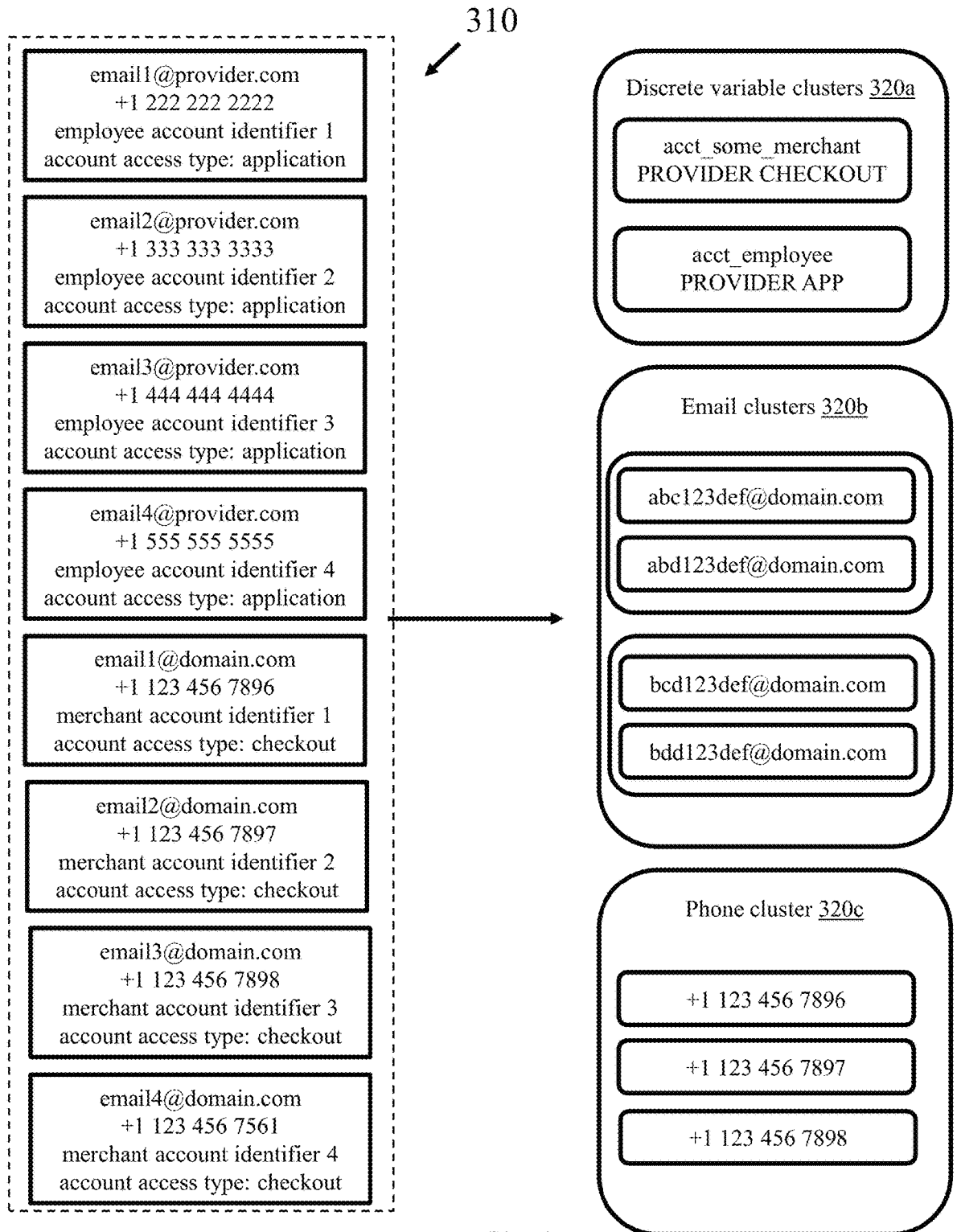
FIG. 3 illustrates examples of accounts and example associations determined by an account verification system according to an embodiment.

FIG. 3 illustrates a non-limiting example of a dataset 300 (e.g., a training dataset). In some embodiments, the dataset 300 is generated based on an analytics server (e.g., an analytics server that is the same as, or similar to, the analytics server 110a of FIG. 1) receiving one or more requests to generate new user accounts (referred to collectively as API requests). In some embodiments, the dataset includes data associated with multiple requests to generate new user accounts (referred to herein as API requests 310). As illustrated, the API requests 310 can be associated with (e.g., specify) one or more fields. For example, certain API requests 310 can specify fields associated with identifiers and/or user attributes as described with respect to FIG. 2. In illustrated examples, the API requests specify an email (e.g., email1@provider.com), a phone number (e.g., +1 222 222 2222), a user agent (e.g., any information associated with the user/agent), an account identifier (e.g., employee identifier 1-4, merchant identifier 1-4), and a browser used to generate the API requests (e.g., application (indicating the API request was generated by an application executed on an end user device), checkout (indicating the API request was generated based on input received during an online checkout process), and/or the like).

In some embodiments, the API requests 310 are clustered. For example, an analytics server (e.g., an analytics server that is the same as, or similar to, analytics server 110a of FIG. 1) may cluster the API requests 310 into discrete variable clusters 320a, email clusters 320b, and phone clusters 320c. In examples, each cluster includes one or more sub-clusters (e.g., discrete variable clusters 320a and email clusters 320b). In some examples, a cluster does not include one or more sub-clusters (e.g., phone cluster 320c). It will be appreciated that there may be additional or different clusters than those illustrated by FIG. 3 that are within the scope of the present disclosure.

The depicted clusters indicate/illustrate the closeness (e.g., distance which can be calculated by the machine learning model representing a degree of similarity) between different API requests. For instance, the email clusters 320b comprises API requests that are clustered according to particular patterns of emails (e.g., abc123def and abd123def). In this instance, emails that do not follow the particular pattern (e.g., do not share enough characters in common) are not associated with the same cluster (e.g., abc123def and bcd123def). In another example, the phone cluster 320c comprises phone numbers corresponding to different API requests where the phone numbers seem to follow a machine-created or automated pattern (e.g., phone numbers that form an uninterrupted series of phone numbers). As described above with respect to step 220 of FIG. 2, API requests that are closer in distance to API requests included in clusters of requests known to be generated using one or more programming protocols have a higher likelihood of having been generated using such protocols; and API requests that are farther in distance have a lower likelihood of having been generated using such protocols. In some embodiments, clustering techniques are used to identify multiple or different features by which API requests can be clustered. For example, as discussed above with respect to step 220, techniques such as K-means clustering and/or the like may be used to cluster API requests (e.g., based on one or more aspects of the API requests).

The models discussed herein can use this clustering paradigm to be trained to determine whether a new API request corresponds to a machine-made pattern. For instance, the machine learning model discussed herein may determine a mathematical distance between a new API request and the cluster 320b. If the distance is less than a threshold, the machine learning model may determine that the new API request is closely related to and exhibits high resemblance to a cluster of email patterns known to have been generated by a machine. Therefore, the machine learning model may determine that the new API request is not generated by a human.

Figure 4A:
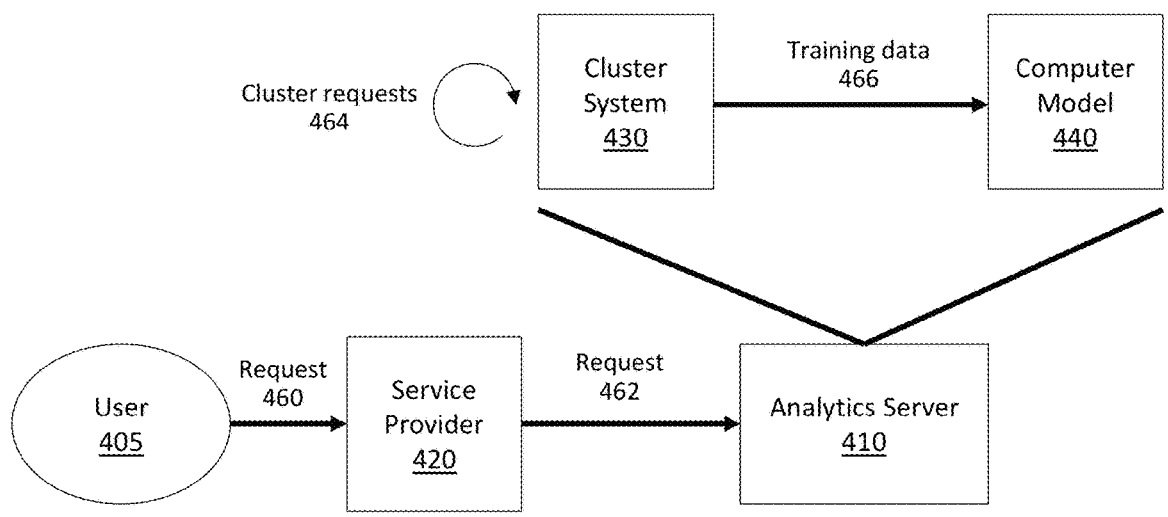
FIGS. 4A and 4B are diagrams of an implementation according to an embodiment.
Figure 4B:
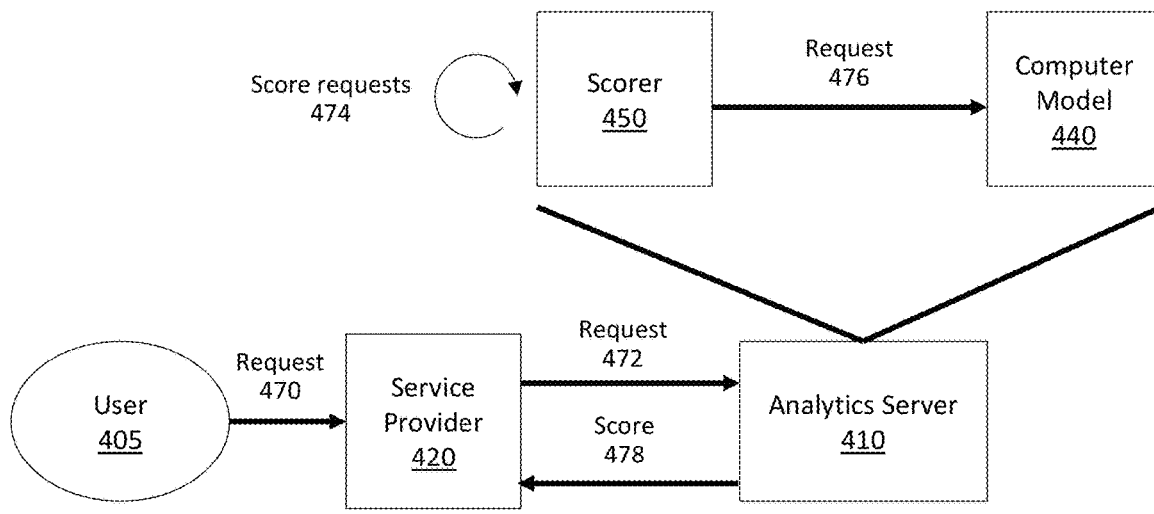

FIGS. 4A and 4B illustrate a non-limiting example of an implementation 400 of an account verification system according to embodiments of the present disclosure. Specifically, FIG. 4A (example 400) illustrates a non-limiting example of offline training of a computer model; and FIG. 4B (example 401) illustrates a non-limiting example of online use of the computer model to detect requests to generate new user accounts that were generated automatically using one or more programming protocols. In some embodiments, one or more of the computing devices may be the same as, or similar to, one or more of the computing devices of FIG. 1. For example, service provider 420 may be the same as, or similar to, one or more service providers 120 of FIG. 1, analytics server 410 may be the same as, or similar to, analytics server 110a of FIG. 1, and computer model 440 may be the same as, or similar to, machine learning model 160a of FIG. 1.

As shown by reference number 460, a user 405 transmits data associated with a request to generate a new user account (described throughout FIGS. 4A and 4B as requests). The user 405 may use an end user device (e.g., an end user device that is the same as, or similar to, the end user devices 140 of FIG. 1) to transmit the request. The request may be generated by the end user device based on input provided by the user to the end user device. In some implementations, the request is the same as, or similar to, API requests described herein.

As shown by reference number 462, the service provider 420 transmits the data associated with the request to an analytics server 410.

As shown by reference number 464, the analytics server 410 causes a cluster system 430 to cluster one or more requests. For example, the analytics server 410 can cause the cluster system 430 to cluster one or more requests based on techniques described with respect to FIGS. 2 and 3. The analytics server 410 may cause one or more requests to be denied based on the analytics server 410 determining that the one or more requests were generated automatically using one or more programming protocols during the clustering (without using computer model 440).

As shown by reference number 466, the analytics server 410 provides training data to the computer model 440 to train the computer model 440. For example, the analytics server 410 may generate the training data based on one or more techniques described with respect to FIG. 2 and the analytics server 410 may provide the training data to the computer model 440 to train the computer model 440. In some embodiments, when the prediction regarding the request 460 is confirmed, the analytics server 410 may use this request as additional training data.

Referring now to FIG. 4B, as shown by reference number 470 a user 405 transmits data associated with a request to generate a new user account. The user may use an end user device as described with respect to reference number 460 when transmitting the data associated with the request.

As shown by reference number 472, the service provider 420 transmits the data associated with the request to an analytics server 410. The analytics server 410 may determine that the analytics server 410 can process the request (and may send an HTTP 200 response to the service provider 420) or that the analytics server 410 has received too many requests (and may send an HTTP 426 response to the service provider 420).

As shown by reference number 474, the analytics server 410 uses a scorer 450 to score the request. For example, analytics server 410 can use a scorer 450 to score the request, where the scorer 450 compares identifiers and/or attributes associated with the request to one or more identifiers and/or attributes known to be associated with malicious third parties. In some embodiments, the scorer 450 determines the score based on one or more existing rules. For example, the scorer 450 may determine the score based on one or more identifiers and/or attributes known to be associated with malicious third parties being further associated with (e.g., included in) the request. In some embodiments, the analytics server 410 causes the scorer 450 to provide data associated with the request to the computer model 440 to cause the computer model 440 to generate a score (described below with respect to reference number 476). The scorer 450 may then receive the score and determine whether the request is or is not associated with a malicious third party based on the score. In some embodiments, when the scorer 450 determines the request is not associated with a malicious third party, the scorer 450 forgoes preventing the request from being processed; and when the scorer 450 determines the request is associated with a malicious third party, the scorer 450 prevents the request from being processed.

As shown by reference number 476, the analytics server 410 provides data associated with the request to the computer model 440 to cause the computer model 440 to generate a score. In some implementations, the analytics server 410 provides the data associated with the request to the computer model 440 directly (e.g., without first sending the data associated with the request to the scorer 450). The score can indicate whether the request was generated automatically using one or more programming protocols. The score may be a binary score (e.g., 0 if generated by a human, 1 if generated automatically using the one or more programming protocols). In embodiments, the score is a value within a range (e.g., a value between 0 and 1, where values closer to 0 indicate the request was generated by a human and values closer to 1 indicate the request was generated automatically using the one or more programming protocols). For instance, the score may correspond to a distance between the request and a cluster of known API requests known to have been generated using a programing protocol.

As shown by reference number 478, the analytics server 410 transmits a score. For example, the analytics server 410 can transmit the score generated based on (e.g., in response to) the analytics server 410 providing the data associated with the request to the computer model 440. In some embodiments, the analytics server 410 compares the score to a threshold value. When the threshold value is satisfied, the analytics server 410 may determine that the request was generated automatically using the one or more programming protocols and the analytics server 410 transmits a score to cause the service provider 420 to forgo creating the new user account. When the threshold value is not satisfied, the analytics server 410 may determine that the request was generated by a human and the analytics server 410 transmits a score to cause the service provider 420 to create the new user account. The score may be based on the score determined by the scorer 450.

Figure 5:
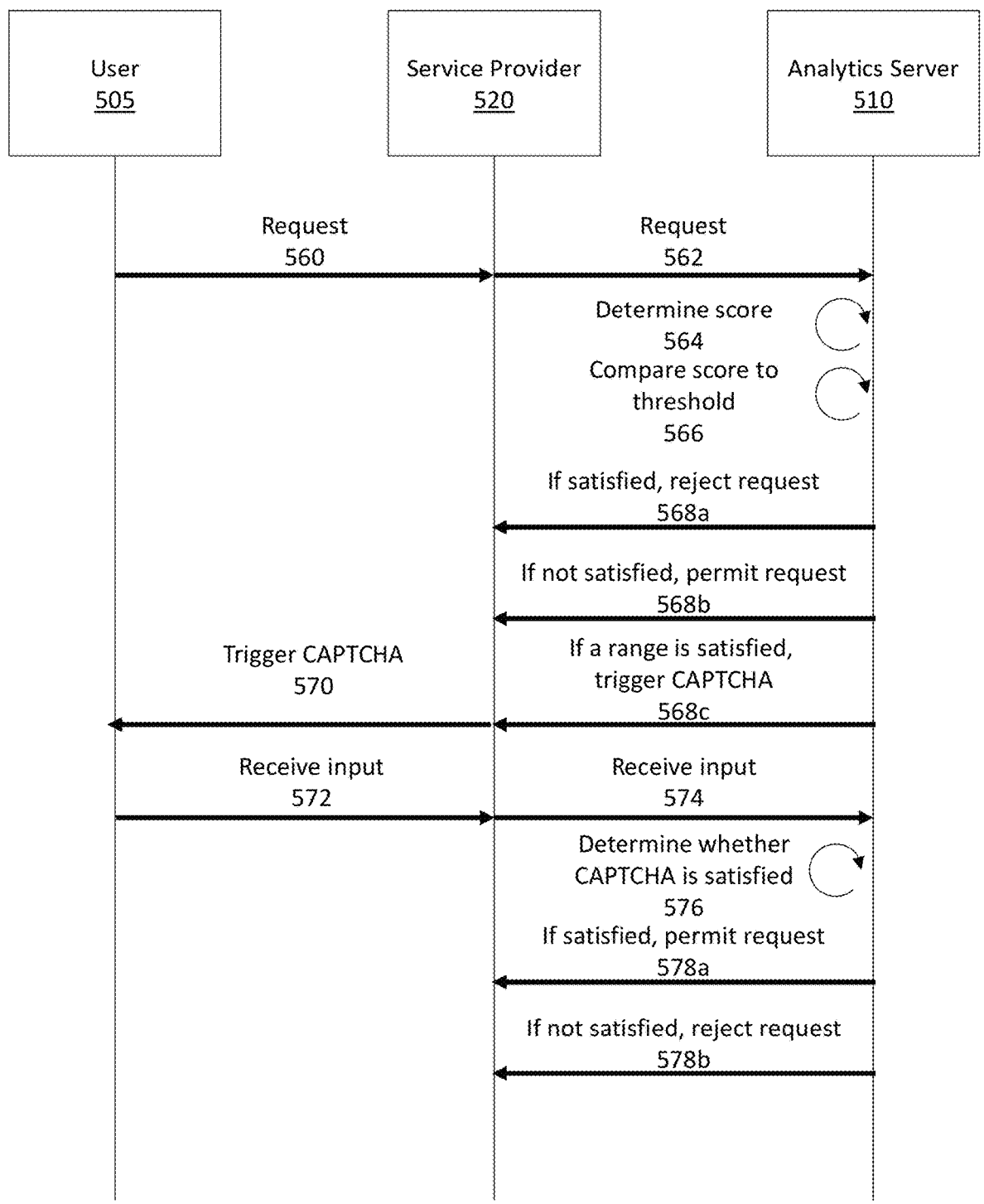
FIG. 5 is a diagram of an implementation according to an embodiment.

FIG. 5 illustrates a non-limiting example of an implementation 500 of an account verification system according to embodiments of the present disclosure. In some embodiments, one or more of the computing devices may be the same as, or similar to, one or more of the computing devices of FIG. 1. For example, service provider 520 may be the same as, or similar to, one or more service providers 120 of FIG. 1, analytics server 510 may be the same as, or similar to, analytics server 110a of FIG. 1. The user 505 can represent an end user device 140 described in FIG. 1.

As shown by reference number 560, a user 505 transmits data associated with a request to generate a new user account (described throughout FIG. 5 as requests). The user 505 may use an end user device (e.g., an end user device that is the same as, or similar to, the end user devices 140 of FIG. 1) to transmit the request.

As shown by reference number 562, the service provider 520 may transmit data associated with the request to an analytics server 510.

As shown by reference number 564, the analytics server 510 determines a score. For example, the analytics server 510 may determine a score based on one or more of the techniques described with respect to FIG. 2. As shown by reference number 566, the analytics server 510 compares the score to a threshold. As shown by reference number 568a, if the analytics server 510 determines that the score satisfies a threshold (e.g., a threshold associated with an indication that the request was generated automatically using one or more programming protocols), the analytics server 510 transmits data associated with an indication that the request is rejected (thereby preventing creation of a new user account) to the service provider 520. As shown by reference number 568b, if the analytics server 510 determines that the score does not satisfy the threshold (e.g., a threshold associated with an indication that the request was generated automatically using one or more programming protocols), the analytics server 510 transmits data associated with an indication that the request is "not rejected" to the service provider 520. In some embodiments, as shown by reference number 568c, if the analytics server 510 determines that the score satisfies a range (e.g., a range bound by an upper and lower threshold value associated with an indication that the request may have been generated automatically using one or more programming protocols), the analytics server 510 transmits data associated with a CAPTCHA request to the service provider 520.

As shown by reference number 570, the service provider 520 transmits the data associated with the CAPTCHA request to the user 505 to trigger the CAPTCHA. This may, in turn, cause a computing device associated with the user 505 to display the CAPTCHA. As shown by reference number 572, the user 505 provides an input, and data associated with the input is transmitted to the service provider 520. As shown by reference number 574, the data associated with the input is transmitted to the analytics server 510.

As shown by reference number 576, the analytics server 510 determines whether the CAPTCHA is satisfied. For example, when the user provides a response to the CAPTCHA that corresponds to a correct response, the data transmitted to the analytics server 510 may be analyzed and the analytics server 510 may then determine that the CAPTCHA is satisfied. In an example, when the user provides a response to the CAPTCHA that does not correspond to a correct response (or fails to provide a response altogether), the data transmitted to the analytics server 510 may be analyzed and the analytics server 510 may then determine that the CAPTCHA is not satisfied.

As shown by reference number 578a, when the analytics server 510 determines that the CAPTCHA is satisfied, the analytics server 510 transmits data associated with an approval of the request to the service provider 520. Alternatively, as shown by reference number 578b, when the analytics server 510 determines that the CAPTCHA is not satisfied, the analytics server 510 transmits data associated with a denial of the request to the service provider 520.

Figure 6:
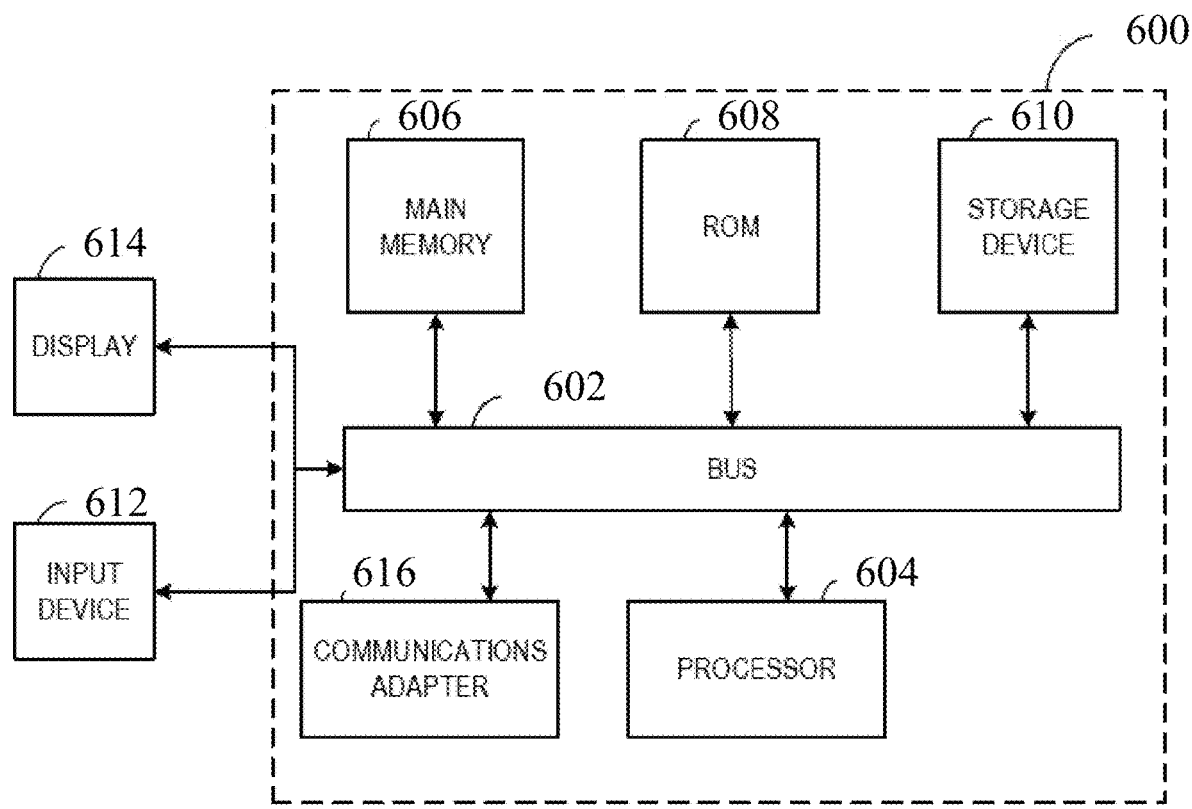
FIG. 6 illustrates a component diagram of a computing system suitable for use in the various implementations described herein, according to an embodiment.

FIG. 6 is a component diagram of an example computing system suitable for use in the various implementations described herein, according to an example implementation. One or more steps of the methods and processes discussed herein can be performed by the computing system depicted in FIG. 6.

The computing system 600 includes a bus 602 or other communication component for communicating information and a processor 604 coupled to the bus 602 for processing information. The computing system 600 also includes main memory 606, such as a RAM or other dynamic storage device, coupled to the bus 602 for storing information, and instructions to be executed by the processor 604. Main memory 606 can also be used for storing position information, temporary variables, or other intermediate information during execution of instructions by the processor 604. The computing system 600 may further include a ROM 608 or other static storage device coupled to the bus 602 for storing static information and instructions for the processor 604. A storage device 610, such as a solid-state device, magnetic disk, or optical disk, is coupled to the bus 602 for persistently storing information and instructions.

The computing system 600 may be coupled via the bus 602 to a display 614, such as a liquid crystal display, or active matrix display, for displaying information to a user. An input device 612, such as a keyboard including alphanumeric and other keys, may be coupled to the bus 602 for communicating information, and command selections to the processor 604. In another implementation, the input device 612 has a touch screen display. The input device 612 can include any type of biometric sensor, or a cursor control, such as a mouse, a trackball, or cursor direction keys, for communicating direction information and command selections to the processor 604 and for controlling cursor movement on the display 614.

In some implementations, the computing system 600 may include a communications adapter 616, such as a networking adapter. Communications adapter 616 may be coupled to bus 602 and may be configured to enable communications with a computing or communications network or other computing systems. In various illustrative implementations, any type of networking configuration may be achieved using communications adapter 616, such as wired (e.g., via Ethernet), wireless (e.g., via Wi-Fi, Bluetooth), satellite (e.g., via GPS) pre-configured, ad-hoc, LAN, WAN, and the like.

According to various implementations, the processes of the illustrative implementations that are described herein can be achieved by the computing system 600 in response to the processor 604 executing an implementation of instructions contained in main memory 606. Such instructions can be read into main memory 606 from another computer-readable medium, such as the storage device 610. Execution of the implementation of instructions contained in main memory 606 causes the computing system 600 to perform the illustrative processes described herein. One or more processors in a multi-processing implementation may also be employed to execute the instructions contained in main memory 606. In alternative implementations, hard-wired circuitry may be used in place of or in combination with software instructions to implement illustrative implementations. Thus, implementations are not limited to any specific combination of hardware circuitry and software.

The implementations described herein have been described with reference to drawings. The drawings illustrate certain details of specific implementations that implement the systems, methods, and programs described herein. However, describing the implementations with drawings should not be construed as imposing on the disclosure any limitations that may be present in the drawings.

As used herein, the term "circuit" may include hardware structured to execute the functions described herein. In some implementations, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some implementations, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some implementations, the one or more processors may be embodied in various ways. The one or more processors may be constructed in a manner sufficient to perform at least the operations described herein. In some implementations, the one or more processors may be shared by multiple circuits (e.g., circuit A and circuit B may comprise or otherwise share the same processor, which, in some example implementations, may execute instructions stored, or otherwise accessed, via different areas of memory). Alternatively or additionally, the one or more processors may be structured to perform or otherwise execute certain operations independent of one or more co-processors.

In other example implementations, two or more processors may be coupled via a bus to enable independent, parallel, pipelined, or multi-threaded instruction execution. Each processor may be implemented as one or more general-purpose processors, ASICs, FPGAs, GPUS, TPUs, digital signal processors (DSPs), or other suitable electronic data processing components structured to execute instructions provided by memory. The one or more processors may take the form of a single core processor, multi-core processor (e.g., a dual core processor, triple core processor, or quad core processor), microprocessor, etc. In some implementations, the one or more processors may be external to the apparatus, for example, the one or more processors may be a remote processor (e.g., a cloud-based processor). Alternatively or additionally, the one or more processors may be internal or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the implementations might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile or non-volatile memories), etc. In some implementations, the non-volatile media may take the form of ROM, flash memory (e.g., flash memory such as NAND, 3D NAND, NOR, 3D NOR), EEPROM, MRAM, magnetic storage, hard discs, optical discs, etc. In other implementations, the volatile storage media may take the form of RAM, TRAM, ZRAM, etc. Combinations of the above are also included within the scope of machine-readable media. In this regard, machine-executable instructions comprise, for example, instructions and data, which cause a general-purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example implementations described herein.

It should also be noted that the term "input devices," as described herein, may include any type of input device including, but not limited to, a keyboard, a keypad, a mouse, joystick, or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative implementations. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed only in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation, and references to "an implementation," "some implementations," "an alternate implementation," "various implementation," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The foregoing description of implementations has been presented for purposes of illustration and description. It is not intended to be exhaustive or to limit the disclosure to the precise form disclosed, and modifications and variations are possible in light of the above teachings or may be acquired from this disclosure. The implementations were chosen and described in order to explain the principals of the disclosure and its practical application to enable one skilled in the art to utilize the various implementations and with various modifications as are suited to the particular use contemplated. Other substitutions, modifications, changes, and omissions may be made in the design, operating conditions and implementation of the implementations without departing from the scope of the present disclosure as expressed in the appended claims.

No aspect, component, element, structure, act, step, function, instruction, and/or the like used herein should be construed as critical or essential unless explicitly described as such. In addition, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open ended terms. Further, the phrase "based on" is intended to mean "based at least partially on" unless explicitly stated otherwise.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various components, blocks, modules, circuits, and steps have been generally described in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc, where "disks" usually reproduce data magnetically, while "discs" reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

Some non-limiting embodiments of the present disclosure are described herein in connection with a threshold. As described herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

We claim:

1. A method comprising:
   receiving, by a server via an application programming interface (API), an API request to generate a new user account, the API request comprising at least one user identifier and at least one user attribute;
   executing, by the server using the at least one user identifier and the at least one user attribute, a machine learning model to predict a likelihood of the API request having been generated automatically using one or more programming protocols,
      wherein the machine learning model has been trained using a training dataset comprising a set of training user accounts known to have been generated via the one or more programming protocols and their corresponding attributes, and
      wherein the machine learning model executes a clustering protocol and calculates a distance between the API request and a cluster comprising at least a subset of the set of training user accounts,
      wherein the distance is correlated to the likelihood of the API request having been generated automatically; and
   in response to the likelihood of the API request satisfying a threshold, executing, by the server, an additional security protocol associated with the new user account, wherein the threshold indicates a sensitivity level associated with new user accounts being generated by human users.

2. The method of claim 1, wherein the additional security protocol is a two-factor authentication.

3. The method of claim 1, wherein the additional security protocol is presenting an authentication protocol to determine whether the new user account was created by a human user.

4. The method of claim 1, wherein the at least one user attribute is a time difference between a first timestamp for receipt of the API request and a second timestamp for receipt of a second API request.

5. The method of claim 1, wherein the server executes the machine learning model at a predetermined time subsequent to receiving the API request.

6. The method of claim 1, wherein the at least one user attribute is at least one of a phone number, a physical address, or an IP address associated with the API request.

7. The method of claim 1, further comprising:
denying, by the server, generation of the new user account as a non-human created account.

8. A non-transitory machine-readable storage medium having computer-executable instructions stored thereon that, when executed by one or more processors, cause the one or more processors to perform operations comprising:
receive, via an application programming interface (API), an API request to generate a new user account, the API request comprising at least one user identifier and at least one user attribute;
execute, using the at least one user identifier and the at least one user attribute, a machine learning model to predict a likelihood of the API request having been generated automatically using one or more programming protocols,
wherein the machine learning model has been trained using a training dataset comprising a set of training user accounts known to have been generated via the one or more programming protocols and their corresponding attributes, and
wherein the machine learning model executes a clustering protocol and calculates a distance between the API request and a cluster comprising at least a subset of the set of training user accounts,
wherein the distance is correlated to the likelihood of the API request having been generated automatically; and
in response to the likelihood of the API request satisfying a threshold, executing an additional security protocol associated with the new user account, wherein the threshold indicates a sensitivity level associated with new user accounts being generated by human users.

9. The non-transitory machine-readable storage medium of claim 8, wherein the additional security protocol is a two-factor authentication.

10. The non-transitory machine-readable storage medium of claim 8, wherein the additional security protocol is presenting an authentication protocol to determine whether the new user account was created by a human user.

11. The non-transitory machine-readable storage medium of claim 8, wherein the at least one user attribute is a time difference between a first timestamp for receipt of the API request and a second timestamp for receipt of a second API request.

12. The non-transitory machine-readable storage medium of claim 8, wherein the instructions are further configured to cause the one or more processors to execute the machine learning model at a predetermined time subsequent to receiving the API request.

13. The non-transitory machine-readable storage medium of claim 8, wherein the at least one user attribute is at least one of a phone number, a physical address, or an IP address associated with the API request.

14. The non-transitory machine-readable storage medium of claim 8, wherein the instructions are further configured to cause the one or more processors to:
deny generation of the new user account as a non-human created account.

15. A system comprising a processor configured to:
receive, via an application programming interface (API), an API request to generate a new user account, the API request comprising at least one user identifier and at least one user attribute;
execute, using the at least one user identifier and the at least one user attribute, a machine learning model to predict a likelihood of the API request having been generated automatically using one or more programming protocols,
wherein the machine learning model has been trained using a training dataset comprising a set of training user accounts known to have been generated via the one or more programming protocols and their corresponding attributes, and
wherein the machine learning model executes a clustering protocol and calculates a distance between the API request and a cluster comprising at least a subset of the set of training user accounts,
wherein the distance is correlated to the likelihood of the API request having been generated automatically; and
in response to the likelihood of the API request satisfying a threshold, executing an additional security protocol associated with the new user account, wherein the threshold indicates a sensitivity level associated with new user accounts being generated by human users.

16. The system claim 15, wherein the additional security protocol is a two-factor authentication.

17. The system of claim 15, wherein the additional security protocol is presenting an authentication protocol to determine whether the new user account was created by a human user.

18. The system of claim 15, wherein the at least one user attribute is a time difference between a first timestamp for receipt of the API request a second timestamp for receipt of a second API request.

19. The system of claim 15, wherein the processor is further configured to:
cause the one or more processors to execute the machine learning model at a predetermined time subsequent to receiving the API request.

20. The system of claim 15, wherein the at least one user attribute is at least one of a phone number, a physical address, or an IP address associated with the API request.

* * * * *